(12) United States Patent
Yuan et al.

(10) Patent No.: US 10,372,300 B2
(45) Date of Patent: Aug. 6, 2019

(54) METHOD, APPARATUS AND MOBILE TERMINAL FOR TRIGGERING WIDGET IN APPLICATION (71) Applicant: BEIJING KINGSOFT INTERNET SECURITY SOFTWARE CO., LTD., Beijing (CN)

(72) Inventors: Guoqing Yuan, Beijing (CN); Kangzong Zhang, Beijing (CN); Nan Zhang, Beijing (CN); Yong Chen, Beijing (CN); Ming Xu, Beijing (CN)

(73) Assignee: BEIJING KINGSOFT INTERNET SECURITY SOFTWARE CO., LTD., Beijing (CN)

(*) Notice: Subject to any disclaimer, the term of this patent is extended or adjusted under 35 U.S.C. 154(b) by 258 days.

(21) Appl. No.: 15/322,609

(22) PCT Filed: Jun. 23, 2015

(86) PCT No.: PCT/CN2015/082119
§ 371 (c)(1),
(2) Date: Dec. 28, 2016

(87) PCT Pub. No.: WO2016/000547
PCT Pub. Date: Jan. 7, 2016

(65) Prior Publication Data
US 2017/0153778 A1 Jun. 1, 2017

(30) Foreign Application Priority Data
Jun. 30, 2014 (CN) .......................... 2014 1 0309642

(51) Int. Cl.
*G06F 3/048* (2013.01)
*G06F 3/0483* (2013.01)
(Continued)

(52) U.S. Cl.
CPC ........ *G06F 3/0483* (2013.01); *G06F 3/04847* (2013.01); *G06F 9/451* (2018.02);
(Continued)

(58) Field of Classification Search
CPC ...................................................... G06F 3/016
See application file for complete search history.

(56) References Cited

U.S. PATENT DOCUMENTS

2002/0122065 A1* 9/2002 Segal ...................... G06F 21/56
715/783
2008/0155514 A1* 6/2008 Couldwell .......... G06F 11/3692
717/135
(Continued)

FOREIGN PATENT DOCUMENTS

CN 1484790 A 3/2004
CN 102117470 A 7/2011
(Continued)

OTHER PUBLICATIONS

PCT/CN2015/082119 English Translation of the International Search Report dated Sep. 29, 2015, 2 pages.
(Continued)

*Primary Examiner* — Claudia Dragoescu
(74) *Attorney, Agent, or Firm* — Lathrop Gage LLP (57) ABSTRACT

Disclosed in the present invention is a method for triggering a widget in an application. The method includes: obtaining the layout information of the first page in the application; extracting the clickable widgets in the first page and the corresponding widget types according to the layout information of the first page; and obtaining the corresponding click-trigger modes according to the corresponding widget types and triggering the clickable widgets through the corresponding click-trigger modes. Thus, an application behavior can be triggered orderly and intelligently, manual work-
(Continued)

load is reduced greatly, the efficiency is improved and the completeness of triggering the application behavior can be guaranteed. Further disclosed in the present invention are an apparatus for triggering the widget in the application, a mobile terminal and a storage medium.

14 Claims, 5 Drawing Sheets

(51) Int. Cl.
    *G06F 21/56*    (2013.01)
    *G06F 9/451*    (2018.01)
    *G06F 3/0484*   (2013.01)
    *G06F 11/36*    (2006.01)
    *G06F 17/21*    (2006.01)

(52) U.S. Cl.
    CPC ........ *G06F 11/3664* (2013.01); *G06F 17/212* (2013.01); *G06F 21/56* (2013.01); *G06F 21/566* (2013.01); *G06F 2221/034* (2013.01)

(56) References Cited

U.S. PATENT DOCUMENTS

| | | | |
|---|---|---|---|
| 2009/0303676 A1* | 12/2009 | Behar | G06F 1/162 |
| | | | 361/679.27 |
| 2015/0058826 A1* | 2/2015 | Hu | G06F 11/362 |
| | | | 717/128 |

FOREIGN PATENT DOCUMENTS

| | | |
|---|---|---|
| CN | 103164300 A | 6/2013 |
| CN | 103186740 A | 7/2013 |

OTHER PUBLICATIONS

PCT/CN2015/082119 English Translation of the Written Opinion dated Sep. 29, 2015, 7 pages.
Chinese Patent Application No. 201410309642.X First Office Action dated Feb. 28, 2018, 6 pages.
Chinese Patent Application No. 201410309642.X English translation of First Office Action dated Feb. 28, 2018, 7 pages.

\* cited by examiner

METHOD, APPARATUS AND MOBILE TERMINAL FOR TRIGGERING WIDGET IN APPLICATION

CROSS REFERENCE TO RELATED APPLICATION

This application claims priority to and benefits of Chinese Patent Application No. 201410309642.X, filed with State Intellectual Property Office on Jun. 30, 2014, which is entitled as "Method and apparatus for triggering widget in application, and mobile terminal" and owed by BEIJING KINGSOFT INTERNET SECURITY SOFTWARE CO., LTD., the entire content of which is incorporated herein by reference.

FIELD

The present disclosure relates to mobile terminal device technology field, and more particularly to a method and an apparatus for triggering a widget in an application and a mobile terminal.

BACKGROUND

Currently, in many application scenes, each function of the application needs to be used so as to ensure that files, network and other actions corresponding to the application can be triggered. For example, in an automatic virus detection process, when all of the actions can be triggered, it can be easily determined whether the application is a virus file; as another example, in an automatic garbage recognition process, when all of the files can be triggered, it can be recognized whether the application is a garbage file. However, these are ensured by requiring a complete click-trigger, and therefore a full automatic trigger is necessary.

For a present automatic click method, it generally divides a screen into different area zones according to pixel points of the screen, and then clicks the area zones one by one. However, this click method not only wastes time, but also causes much useless click, and it cannot ensure that all of the clickable widgets are clicked, such that the efficiency is lower and the accuracy is lower.

SUMMARY

Embodiments of the present disclosure seek to solve at least one of the problems existing in the related art to some extent.

Accordingly, a first objective of the present disclosure is to provide a method for triggering a widget in an application, which may implement triggering an application behavior orderly and intelligently, so that manual workload is reduced greatly and the efficiency is improved, and moreover it ensures that the application behavior is triggered completely.

A second objective of the present disclosure is to provide an apparatus for triggering a widget in an application.

A third objective of the present disclosure is to provide a mobile terminal.

A fourth objective of the present disclosure is to provide a storage medium.

In order to achieve the above objectives, embodiments of a first aspect of the present disclosure provide a method for triggering a widget in an application, and the method includes: obtaining layout information of a first page in the application; extracting clickable widgets in the first page and widget types corresponding to the clickable widgets according to the layout information of the first page; and obtaining corresponding click-trigger modes according to the widget types and triggering the clickable widgets through the corresponding click-trigger modes.

In order to achieve the above objectives, embodiments of a second aspect of the present disclosure provide an apparatus for triggering a widget in an application, and the apparatus includes: an obtaining module, configured to obtain layout information of a first page in the application; a first extracting module, configured to extract clickable widgets in the first page and widget types corresponding to the clickable widgets according to the layout information of the first page; and a first triggering module, configured to obtain corresponding click-trigger modes according to the widget types and triggering the clickable widgets through the corresponding click-trigger modes.

In order to achieve the above objectives, embodiments of a third aspect of the present disclosure provide a mobile terminal, and the mobile terminal includes a housing, a processor, a memory, a circuit board and a power supply circuit, in which, the circuit board is disposed inside a space enclosed by the housing, the processor and the memory are disposed on the circuit board; the power supply circuit is configured to supply power to respective circuits or elements of the mobile terminal; the memory is configured to store executable program codes; and the processor is configured to run a program corresponding to the executable program codes by reading the executable program codes stored in the memory, so as to execute following steps: obtaining layout information of a first page in the application; extracting clickable widgets in the first page and widget types corresponding to the clickable widgets according to the layout information of the first page; and obtaining corresponding click-trigger modes according to the widget types and triggering the clickable widgets through the corresponding click-trigger modes.

In order to achieve the above objectives, embodiments of a fourth aspect of the present disclosure provide a storage medium, configured to store an application, in which the application is configured to execute the method for triggering a widget in an application in embodiments of the first aspect of the present disclosure.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Embodiments of the present disclosure will be described in details in the following descriptions, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present disclosure. The embodiments shall not be construed to limit the present disclosure.

In the following, a method and an apparatus for triggering a widget in an application and a mobile terminal according to embodiments of the present disclosure will be described with reference to drawings.

Figure 1:
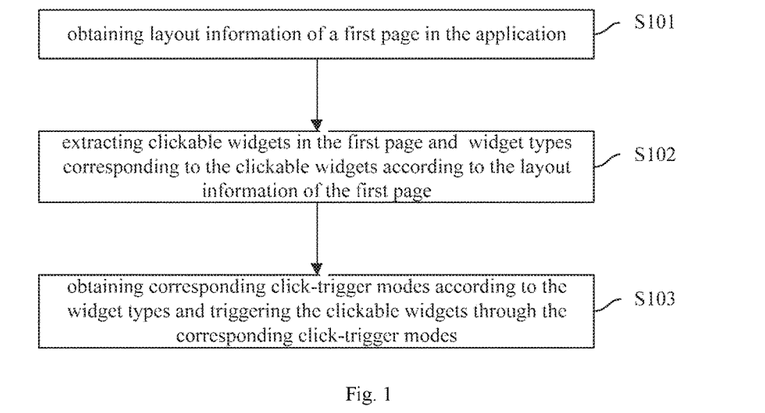
FIG. 1 is a flow chart of a method for triggering a widget in an application according to an embodiment of the present disclosure.

FIG. 1 is a flow chart of a method for triggering a widget in an application according to an embodiment of the present disclosure. As shown in FIG. 1, the method for triggering a widget in an application may include following steps.

In step S101, layout information of a first page in the application is obtained.

In an embodiment of the present disclosure, the application may work in Android operation system, and may obtain the layout information of the first page via an ADB (Android Debug Bridge) interface (an interface working as a debug bridge).

For example, the application may be started at first, and then with the ADB interface provided by the Android operation system, the layout information of the first page (i.e. the page running currently) in the application is obtained using an "adb shell uiautomator" command in the ADB interface. The layout information may include names, attributes and types of the widgets.

In step S102, clickable widgets in the first page and widget types corresponding to the clickable widgets are extracted according to the layout information of the first page.

It should be understood that, the widget may be interpreted as an interface provided by the system. The widget is a capsulation of data and method, and the widget may have an attribute and a method of itself, in which, the attribute is an easy visitor of the widget data, and the method refers to some simple and common functions of the widget.

In addition, different widgets have different widget types, and the widget types may include but not limited to a user interface widget, a diagram widget, a report widget, a grid widget, a bar code widget, an image processing widget, and a document processing widget.

In step S103, corresponding click-trigger modes are obtained according to the widget types, and the clickable widgets are triggered through the corresponding click-trigger modes.

Specifically, since different widget types have different click-trigger modes, corresponding clock-trigger modes may be used in sequence according to different widget types, and the clickable widgets are triggered according to the corresponding click-trigger modes, such that an effect that all of the pages are completely triggered is reached. For example, a widget in a type of button needs to be clicked or be long-clicked, and a widget in a type of textbox needs to input texts.

With the method for triggering a widget in an application provided in embodiments of the present disclosure, layout information of the page currently run by the application can be obtained using a recursion method, all of the clickable widgets can be obtained by analyzing the layout information, and then different click-trigger modes are used in sequence according to different widget types, which finally realizes an effect that all of the pages may be completely triggered and clicked. Thus, an application behavior can be triggered orderly and intelligently, manual workload is reduced greatly, the efficiency is improved and the completeness of triggering the application behavior can be guaranteed.

Figure 2:
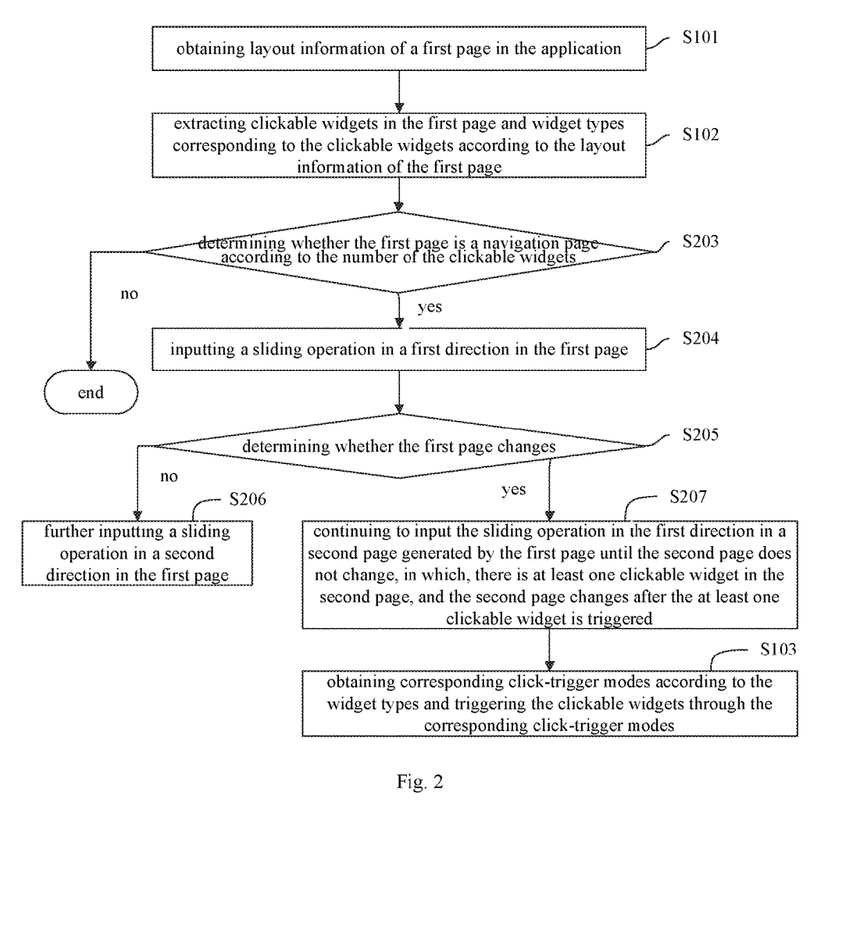
FIG. 2 is a flow chart of a method for triggering a widget in an application according to another embodiment of the present disclosure.

Alternatively, according to an embodiment of the present disclosure, as shown in FIG. 2, after the clickable widgets in the first page and the widget types corresponding to the clickable widgets are extracted according to the layout information of the first page (i.e. the above step S102), the method further includes following steps.

In step S203, it is determined whether the first page is a navigation page according to the number of the clickable widgets.

Specifically, after the clickable widgets in the first page and the widget types corresponding to the clickable widgets are extracted according to the layout information of the first page, it can be determined whether the first page is a navigation page according to the number of the clickable widgets. If the number of the clickable widgets in the first page is less than a preset threshold, the first page may be determined as the navigation page. In embodiments of the present disclosure, the preset threshold may be set by the system, e.g. the preset threshold may be 6.

In step S204, if the first page is determined as the navigation page, a sliding operation in a first direction is inputted in the first page.

The first direction may be leftward, rightward, upward or downward.

Specifically, since the navigation page may be switched to a secondary page by sliding a screen leftward, rightward, upward or downward, whether the first page is the navigation page may be determined first when it enters the first page of the application at starting the application. If the first page is the navigation page, a trigger operation is executed on each of the pages guided by the navigation page.

In step S205, it is determined whether the first page changes.

In step S206, if it is determined that the first page does not change, a sliding operation in a second direction is further inputted in the first page.

In step S207, if it is determined that the first page changes, the sliding operation in the first direction is inputted in a second page generated by the first page until the second page does not change, in which, there is at least one clickable widget in the second page, and the second page changes after the at least one clickable widget is triggered.

Specifically, when it is determined that the first page changes after the sliding operation in the first direction is inputted in the first page, the sliding operation in the first direction may be still inputted in the second page (i.e. a secondary page of the first page) generated by the first page until the second page does not change, such that the page may be determined as a final page. It should be understood that, since the first page has changed due to the inputted sliding operation in the first direction, it can be understood that the final page may be switched to by inputting the sliding operation on the first direction continuously.

Alternatively, in an embodiment of the present disclosure, after the sliding operation in a second direction is inputted in the first page (i.e. the above step S206), the above step S205 may be executed, i.e. determining whether the first page changes currently. If it is determined that the first page does not change, a sliding operation in a third direction is further inputted in the first page; if it is determined that the first page changes, the sliding operation in the second direction is still inputted in the third page generated by the first page until the third page does not change, in which, there is at least one clickable widget in the third page, and the third page is changed after the at least one clickable widget is triggered.

With the method for triggering a widget in an application provided in embodiments of the present disclosure, it can be determined whether the first page is the navigation page according to the number of the clickable widgets, and if it is determined that the first page is the navigation page, the final page of navigation page may be obtained and switched to by various sliding directions, such that all of the pages can be completely triggered and clicked, and all of the clickable widgets are ensured to be clicked and the accuracy is improved.

Figure 3:
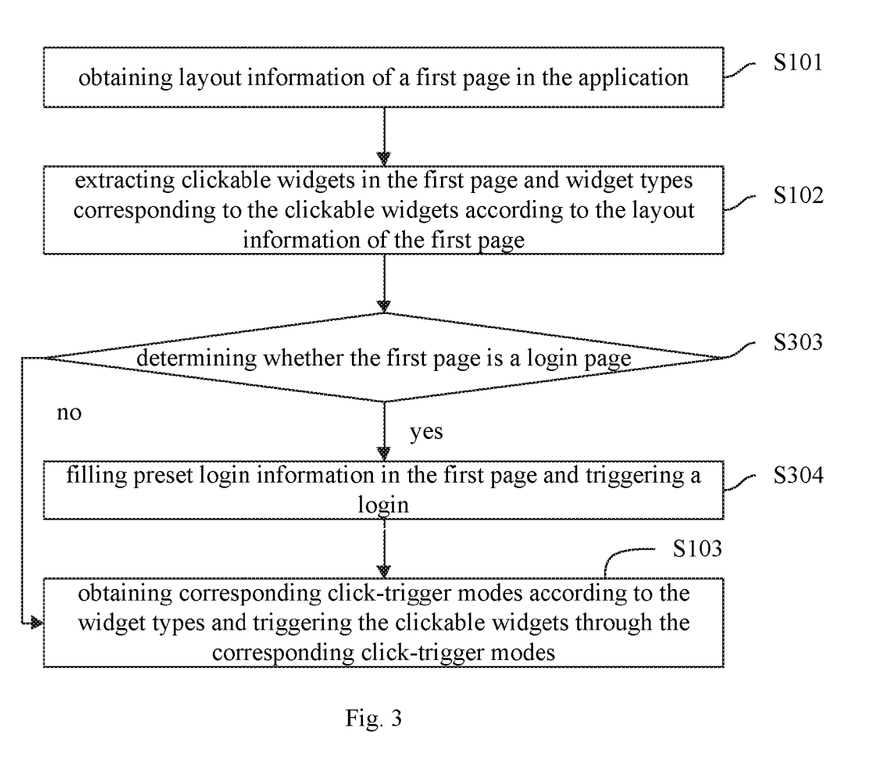
FIG. 3 is a flow chart of a method for triggering a widget in an application according to yet another embodiment of the present disclosure.

Alternatively, according to an embodiment of the present disclosure, as shown in FIG. 3, after the clickable widgets in the first page and the widget types corresponding to the clickable widgets are extracted according to the layout information of the first page (i.e. the above step S102), the method further includes following steps.

In step S303, it is determined whether the first page is a login page.

Specifically, if it is determined that the first page is not the navigation page, or after it enters the final page of the navigation page, it can be determined whether the current application needs to be logged in.

In step S304, if the first page is the login page, preset login information is filled in the first page and a login is triggered.

Specifically, if it is determined that the application needs to be logged in, pre-applied login information (e.g. account/user name, and password etc.) may be obtained according to the name, ID and the like of the application, and the login is triggered by automatically inputting the login information in the first page.

It should be noted that, in the embodiments of the present disclosure, if it is determined that the first page is not the login page (i.e. the application does not need to login), or the login operation has been completed according to the preset login information, the above step S103 may be executed.

With the method for triggering a widget in an application provided in embodiments of the present disclosure, if it is determined that the first page is not the navigation page, or after it enters the final page of the navigation page, it may be determined whether the current application needs to be logged in, and if it is determined that the application needs to be logged in, the preset login information is filled in the first page and the login is triggered, such that the application behavior can be triggered in the login status, an omission of the clickable widgets is avoided, and the accuracy is greatly improved.

Figure 4:
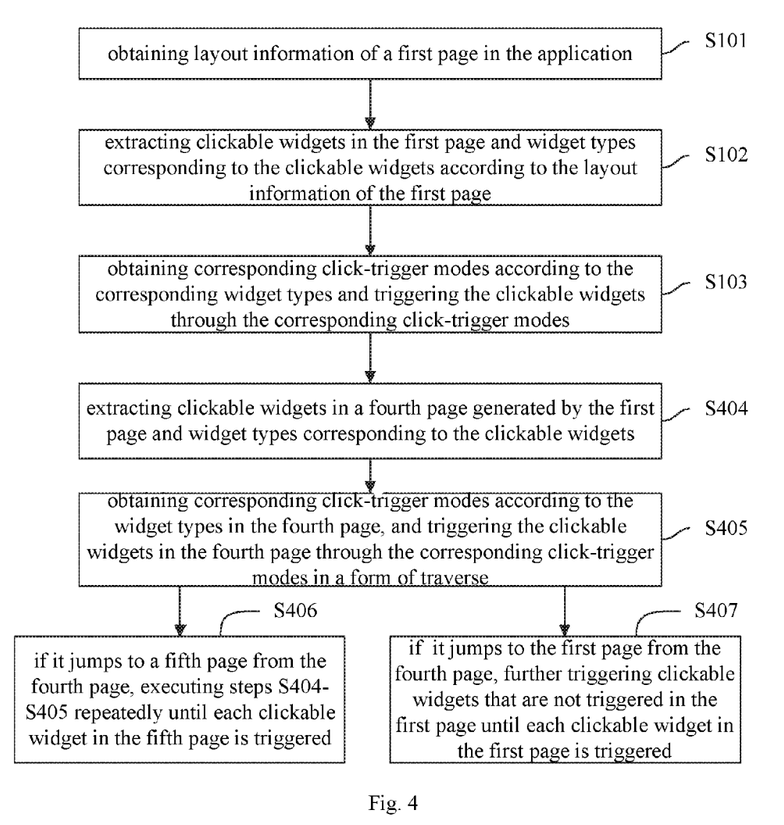
FIG. 4 is a flow chart of a method for triggering a widget in an application according to yet still another embodiment of the present disclosure.

Alternatively, according to an embodiment of the present disclosure, as shown in FIG. 4, after one of the clickable widgets in the first page is triggered through the corresponding click-trigger mode, it may jump to a fourth page generated by the first page, and following steps may be performed.

In step S404, clickable widgets in the fourth page and widget types corresponding to the clickable widgets are extracted.

In step S405, corresponding click-trigger modes are obtained according to widget types in the fourth page, and the clickable widgets are triggered through the corresponding click-trigger modes in a form of traversal.

In step S406, if it jumps to a fifth page from the fourth page, steps S405-S406 are executed such that all of the clickable widgets in the fifth page are triggered.

In step S407, if it jumps to the first page from the fourth page, clickable widgets that are not triggered in the first page are further triggered until all of the clickable widgets in the first page are triggered.

That is, widget information (i.e. clickable widgets and widgets types corresponding to the clickable widgets) of the current page may be obtained first, and then the first clickable widget obtained is clicked. If a page switching occurs, widget information (clickable widgets and widgets types corresponding to the clickable widgets) of the page after switching is obtained and corresponding clickable widgets are clicked. If no page switching occurs, a next clickable widget is clicked in sequence. The above process is repeated until all of the clickable widgets are triggered and clicked.

With the method for triggering a widget in an application provided in embodiments of the present disclosure, by a recursion method of depth traversal, all of the clickable widgets in all the pages of the application are clicked, such that the application behavior triggering is completed, the completeness of triggering the application behavior can be guaranteed, and the accuracy is improved.

In addition, an apparatus for triggering a widget in an application is further provided in the present disclosure.

Figure 5:
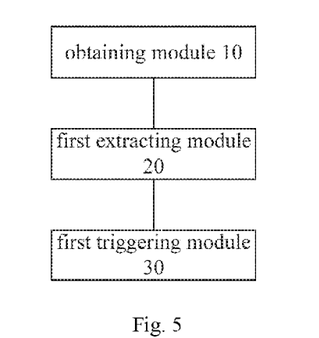
FIG. 5 is a block diagram of an apparatus for triggering a widget in an application according to an embodiment of the present disclosure.

FIG. 5 is a block diagram of an apparatus for triggering a widget in an application according to an embodiment of the present disclosure. As shown in FIG. 5, the apparatus may include: an obtaining module 10, a first extracting module 20 and a first triggering module 30.

Specifically, the obtaining module 10 may be configured to obtain layout information of a first page in the application. In an embodiment of the present disclosure, the application may work in Android operation system, and may obtain the layout information of the first page via an ADB interface.

The first extracting module 20 may be configured to extract clickable widgets in the first page and widget types corresponding to the clickable widgets according to the layout information of the first page. The first triggering module 30 may be configured to obtain corresponding click-trigger modes according to the widget types and triggering the clickable widgets through the corresponding click-trigger modes.

Figure 6:
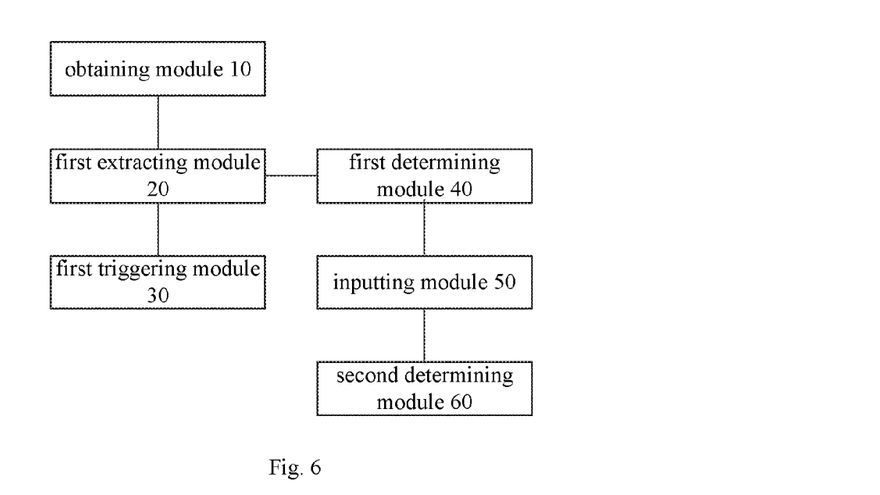
FIG. 6 is a block diagram of an apparatus for triggering a widget in an application according to another embodiment of the present disclosure.

Alternatively, according to an embodiment of the present disclosure, as shown in FIG. 6, the apparatus may further include: a first determining module 40, an inputting module 50 and a second determining module 60. Specifically, the first determining module 20 may be configured to determine whether the first page is a navigation page according to the number of the clickable widgets after the first extracting module 20 extracts the clickable widgets in the first page and the widget types corresponding to the clickable widgets according to the layout information of the first page.

Specifically, after the first extracting module 20 extracts the clickable widgets in the first page and the widget types corresponding to the clickable widgets, the first determining module 40 may determine whether the first page is a navigation page according to the number of the clickable widgets, and determines that the first page is the navigation page if the number of the clickable widgets in the first page is less than a preset threshold.

The inputting module 50 may be configured to input a sliding operation in a first direction in the first page if the first determining module 40 determines that the first page is the navigation page. The second determining module 60 is configured to determine whether the first page changes. If the first page does not change, the inputting module 50 may be further configured to input a sliding operation in a second direction in the first page; and if the first page changes, the inputting module 50 may continue to input the sliding operation in the first direction in a second page generated by the first page until the second page does not change, in which, there is at least one clickable widget in the second page, and the second page changes after the at least one clickable widget is triggered.

Alternatively, in an embodiment of the present disclosure, after the inputting module 50 inputs the sliding operation in the second direction in the first page, the second determining module 60 is triggered to determine whether the first page changes. When the second determining module 60 determines that the first page does not change, the inputting module 50 may be further configured to input a sliding operation in a third direction in the first page; and when the second determining module 60 determines that the first page changes, the inputting module 50 may continue to input the sliding operation in the second direction in a third page generated by the first page until the third page does not change, in which, there is at least one clickable widget in the third page, and the third page changes after the at least one clickable widget is triggered.

Accordingly, in the above embodiment, it may be determined whether the first page is the navigation page according to the number of the clickable widgets, and if the first page is determined as the navigation page, the final page of the navigation page may be obtained and entered by various sliding directions, such that all of the pages may be completely triggered and clicked, all of the clickable widgets are ensured to be clicked, and the accuracy is improved.

Figure 7:
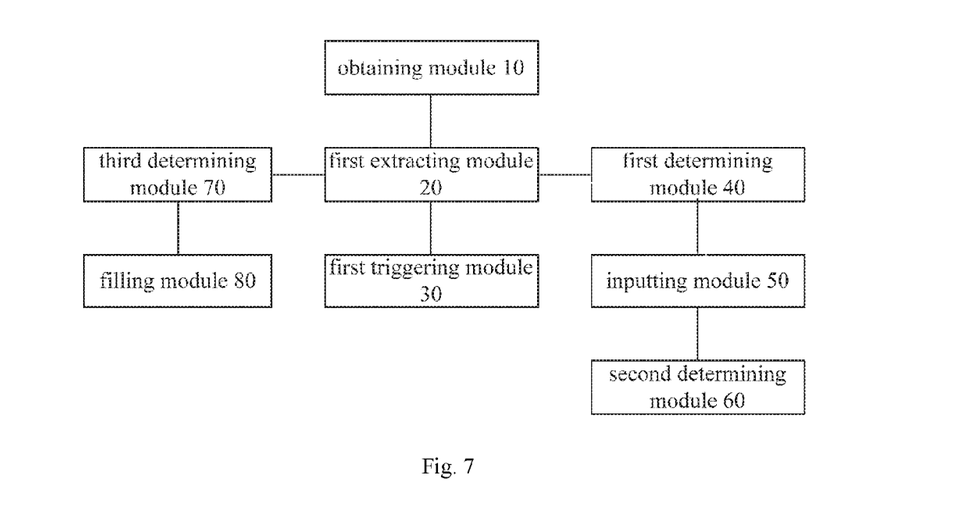
FIG. 7 is a block diagram of an apparatus for triggering a widget in an application according to yet another embodiment of the present disclosure.

Alternatively, according to an embodiment of the present disclosure, as shown in FIG. 7, the apparatus may further include: a third determining module 70 and a filling module 80. Specifically, the third determining module 70 may be configured to determine whether the first page is a login page after the first extracting module 20 extracts the clickable widgets in the first page and the widget types corresponding to the clickable widgets according to the layout information of the first page. If the first page is determined as the login page, the filling module 80 is triggered.

The filling module 80 may be configured to fill preset login information in the first page and trigger a login.

Accordingly, in the above embodiment, if it is determined that the first page is not the navigation page, or after it enters the final page of the navigation page, it may be determined whether the current application needs to be logged in, and when it is determined that the application needs to be logged in, the preset login information is filled in the first page and the login is triggered, such that an application behavior may be triggered in the login status, an omission of clickable widgets may be avoided, and the accuracy is greatly improved.

Figure 8:
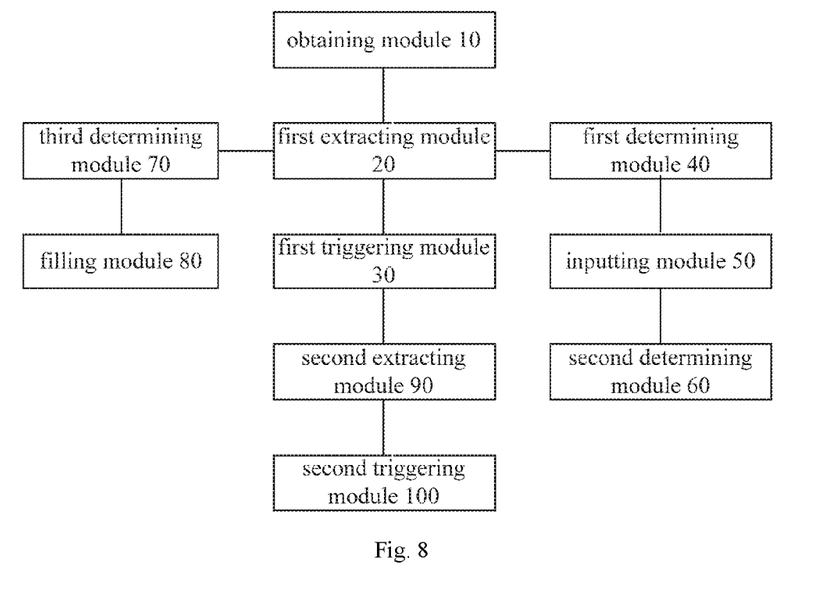
FIG. 8 is a block diagram of an apparatus for triggering a widget in an application according to yet still another embodiment of the present disclosure.

Alternatively, according to an embodiment of the present disclosure, as shown in FIG. 8, the apparatus may further include: a second extracting module 90 and a second triggering module 100. Specifically, if is jumps to a fourth page generated by the first page after the first triggering module 30 triggers one of the clickable widgets in the first page through the corresponding click-trigger mode, the second extracting module 90 may be configured to extract clickable widgets in the fourth page and widget types corresponding to the clickable widgets.

The second triggering module 100 may be configured to obtain corresponding click-trigger modes according to corresponding widget types in the fourth page, and to trigger the clickable widgets through the corresponding click-trigger modes in a form of traversal.

If it jumps to a fifth page from the fourth page, the second extracting module 90 and the second triggering module 100 are triggered such that all of the clickable widgets in the fifth page are triggered. If it jumps to the first page from the fourth page, the first triggering module 30 is triggered, and the first triggering module 30 may be configured to trigger clickable widgets that are not triggered in the first page until all of the clickable widgets in the first page are triggered.

Accordingly, in the above embodiment, by a recursion method of depth traversal, all of the clickable widgets in all of the pages of the application are clicked, such that the application behavior triggering is completed, the completeness of triggering the application behavior can be guaranteed, and the accuracy is improved.

With the apparatus for triggering a widget in an application provided in embodiments of the present disclosure, layout information of the page currently run by the application can be obtained using a recursion method, all of the clickable widgets can be obtained by analyzing the layout information, and then different click-trigger modes are used in sequence according to different widget types, which finally realizes an effect that all of the pages may be completely triggered and clicked. Thus, an application behavior can be triggered orderly and intelligently, manual workload is reduced greatly, the efficiency is improved and the completeness of triggering the application behavior can be guaranteed.

In addition, the present disclosure further provides a mobile terminal. The mobile terminal includes a housing, a processor, a memory, a circuit board and a power supply circuit, in which, the circuit board is disposed inside a space enclosed by the housing, the processor and the memory are disposed on the circuit board; the power supply circuit is configured to supply power to respective circuits or elements of the mobile terminal; the memory is configured to store executable program codes; and the processor is configured to run a program corresponding to the executable program codes by reading the executable program codes stored in the memory, so as to execute following steps.

In step S101', layout information of a first page in the application is obtained.

In step S102', clickable widgets in the first page and widget types corresponding to the clickable widgets are extracted according to the layout information of the first page.

In step S103', corresponding click-trigger modes are obtained according to the corresponding widget types, and the clickable widgets are triggered through the corresponding click-trigger modes.

With the mobile terminal provided in embodiments of the present disclosure, layout information of the page currently run by the application can be obtained using a recursion method, all of the clickable widgets can be obtained by analyzing the layout information, and then different click-trigger modes are used in sequence according to different widget types, which finally realizes an effect that all of the pages may be completely triggered and clicked. Thus, an application behavior can be triggered orderly and intelligently, manual workload is reduced greatly, the efficiency is improved and the completeness of triggering the application behavior can be guaranteed.

In the description of the present disclosure, terms such as "first" and "second" are used herein for purposes of description and are not intended to indicate or imply relative importance or significance. Furthermore, in the description of the present disclosure, "a plurality of" refers to two or more unless otherwise specified.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which may not follow a shown or discussed order according to the related functions in a substantially simultaneous manner or in a reverse order, to perform the function, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A method for triggering a widget in an application, comprising, using a processor executing computer readable instructions stored in a memory:
   obtaining layout information of the application by:
      obtaining the layout information of a first page in the application,
      determining whether the first page is a navigation page according to the number of the clickable widgets, wherein the first page is a navigation page when the number of clickable widgets is less than a preset threshold,
      when the first page is determined as the navigation page:
         inputting a sliding operation in a first direction in the first page,
         determining whether the first page changes,
         when it is determined that the first page does not change, further inputting a sliding operation in a second direction in the first page, and when it is determined that the first page changes, continuing to input the sliding operation in the first direction in a second page generated by the first page until the second page does not change;
extracting clickable widgets in each of the first and second pages and widget types corresponding to the clickable widgets according to the layout information; and
obtaining corresponding click-trigger modes according to the widget types; and
after obtaining the layout information, triggering the clickable widgets through the corresponding click-trigger modes.

2. The method according to claim 1, wherein, there is at least one clickable widget in the second page, and the second page changes after the at least one clickable widget is triggered.

3. The method according to claim 1, wherein, after inputting a sliding operation in a second direction in the first page, the method further comprises, using the processor executing further computer readable instructions stored in the memory:
determining whether the first page changes;
when it is determined that the first page does not change, further inputting a sliding operation in a third direction in the first page;
when it is determined that the first page changes, continuing to input the sliding operation in the second direction in a third page generated by the first page until the third page does not change, wherein, there is at least one clickable widget in the third page, and the third page changes after the at least one clickable widget is triggered.

4. The method according to claim 1, wherein, after extracting clickable widgets in the first page and widget types corresponding to the clickable widgets according to the layout information of the first page, the method further comprises, using the processor executing further computer readable instructions stored in the memory:
determining whether the first page is a login page; and
when the first page is determined as the login page, filling preset login information in the first page and triggering a login.

5. The method according to claim 1, wherein triggering the clickable widgets through the corresponding click-trigger modes comprises, using the processor executing further computer readable instructions stored in the memory:
triggering one of the clickable widgets in the first page through the corresponding click-trigger mode;
when it jumps to a fourth page generated by the first page after the one of the clickable widgets in the first page is triggered, extracting clickable widgets in the fourth page and widget types corresponding to the clickable widgets in the fourth page;
obtaining corresponding click-trigger modes according to the widget types in the fourth page, and triggering the clickable widgets in the fourth page through the corresponding click-trigger modes in a form of traversal;
when it jumps to a fifth page from the fourth page extracting clickable widgets in the fifth page and widget types corresponding to the clickable widgets in the fifth page, obtaining corresponding click-trigger modes according to the widget types in the fifth page, and triggering the clickable widgets in the fifth page through the corresponding click-trigger modes in a form of traversal until each clickable widget in the fifth page is triggered; and
when it jumps to the first page from the fourth page, further triggering clickable widgets that are not triggered in the first page until each clickable widget in the first page is triggered.

6. The method according to claim 1, wherein, the application runs in an Android operating system, and layout information of the first page is obtained via an Android Debug Bridge ADB interface.

7. An apparatus for triggering a widget in an application, comprising:
a memory;
a processor; and
one or more modules, configured to run on the processor, and comprising:
an obtaining module, configured to obtain layout information of the application by: obtaining the layout information of a first page in the application,
determining whether the first page is a navigation page according to the number of the clickable widgets, wherein the first page is a navigation page when the number of clickable widgets is less than a preset threshold,
when the first page is determined as the navigation page:
inputting a sliding operation in a first direction in the first page,
determining whether the first page changes,
when it is determined that the first page does not change, further inputting a sliding operation in a second direction in the first page, and
when it is determined that the first page changes, continuing to input the sliding operation in the first direction in a second page generated by the first page until the second page does not change;
a first extracting module, configured to extract clickable widgets in the first and second pages and widget types corresponding to the clickable widgets according to the layout information; and
a first triggering module, configured to obtain corresponding click-trigger modes according to the widget types and, after obtaining the layout information, to trigger the clickable widgets through the corresponding click-trigger modes.

8. The apparatus according to claim 7, wherein there is at least one clickable widget in the second page, and the second page changes after the at least one clickable widget is triggered.

9. The apparatus according to claim 7, wherein,
the second determining module is triggered after the inputting module inputs a sliding operation in a second direction in the first page;
the inputting module is further configured to input a sliding operation in a third direction in the first page when the second determining module determines that the first page does not change; and
the inputting module is further configured to continue to input the sliding operation in the second direction in a third page generated by the first page until the third page does not change, when the second determining module determines that the first page is changes, in which, there is at least one clickable widget in the third page, and the third page changes after the at least one clickable widget is triggered.

10. The apparatus according to claim 7, wherein the one or more modules further comprises:
a third determining module, configured to determine whether the first page is a login page after the first extracting module extracts the clickable widgets in the first page and the widget types corresponding to the clickable widgets according to the layout information of the first page; and a filling module, configured to fill preset login information in the first page and to trigger a login when the third determining module determines that the first page is the login page.

11. The apparatus according to claim 7, wherein the one or more modules further comprises:

a second extracting module, configured to extract clickable widgets in a fourth page generated by the first page and widget types corresponding to the clickable widgets, when it jumps to the fourth page from the first page after the first triggering module triggers one of the clickable widgets in the first page through the corresponding click-trigger mode; and a second triggering module, configured to obtain corresponding click-trigger modes according to the widget types in the fourth page, and to trigger the clickable widgets in the fourth page through the corresponding click-trigger modes in a form of traversal;

wherein, when it jumps to a fifth page from the fourth page, the second extracting module and the second triggering module are triggered such that each clickable widget in the fifth page is triggered; and wherein, when it jumps to the first page from the fourth page, the first triggering module is triggered, and the first triggering module is configured to trigger clickable widgets that are not triggered in the first page until each clickable widget in the first page is triggered.

12. The apparatus according to claim 7, wherein, the application runs in an Android operating system, and layout information of the first page is obtained via an Android Debug Bridge ADB interface.

13. A mobile terminal, comprising a housing, a processor, a memory, a circuit board and a power supply circuit, wherein, the circuit board is disposed inside a space enclosed by the housing, the processor and the memory are disposed on the circuit board; the power supply circuit is configured to supply power to respective circuits or elements of the mobile terminal; the memory is configured to store executable program codes; and the processor is configured to run a program corresponding to the executable program codes by reading the executable program codes stored in the memory, so as to execute following steps:

obtaining layout information of the application by:
obtaining the layout information of a first page in the application,
determining whether the first page is a navigation page according to the number of the clickable widgets, wherein the first page is a navigation page when the number of clickable widgets is less than a preset threshold,
when the first page is determined as the navigation page:
inputting a sliding operation in a first direction in the first page,
determining whether the first page changes,
when it is determined that the first page does not change, further inputting a sliding operation in a second direction in the first page, and
when it is determined that the first page changes, continuing to input the sliding operation in the first direction in a second page generated by the first page until the second page does not change;
extracting clickable widgets in each of the first and second pages and widget types corresponding to the clickable widgets according to the layout information; and
obtaining corresponding click-trigger modes according to the widget types; and
after obtaining the layout information, triggering the clickable widgets through the corresponding click-trigger modes.

14. The method according to claim 5, wherein triggering the clickable widgets through the corresponding click-trigger modes further comprises:
when it does not jump to another page from the first page after the one of the clickable widgets in the first page is triggered, triggering a next clickable widget in the first page through the corresponding click-trigger mode until each clickable widget in the first page is triggered.

* * * * *